United States Patent [19]

Yoshida et al.

[11] Patent Number: 4,472,122
[45] Date of Patent: Sep. 18, 1984

[54] ROLLING PISTON TYPE COMPRESSOR

[75] Inventors: Kotaro Yoshida; Shuji Fujisaki, both of Fujieda; Toshihide Koda, Osaka; Ken Asada; Susumu Kawaguchi, both of Shizuoka, all of Japan

[73] Assignee: Mitsubishi Denki Kabushiki Kaishi, Tokyo, Japan

[21] Appl. No.: 367,605

[22] Filed: Apr. 12, 1982

[30] Foreign Application Priority Data

Apr. 24, 1981 [JP] Japan .................. 56-59421[U]

[51] Int. Cl.³ ............... F04C 27/00; F04C 29/02; F04C 18/00
[52] U.S. Cl. .................. 418/63; 418/104; 418/151; 308/235
[58] Field of Search .............. 418/63, 151, 104; 308/219, DIG. 8, 187.1, 187.2, 235; 384/132

[56] References Cited

U.S. PATENT DOCUMENTS

| | | | |
|---|---|---|---|
| 2,153,371 | 4/1939 | Hubacker | 418/63 |
| 3,768,880 | 10/1973 | Howe | 308/187.2 |
| 3,847,456 | 11/1974 | Schwarzbich | 308/235 X |
| 3,917,364 | 11/1973 | Kuhn | 384/132 |
| 4,021,085 | 5/1977 | Willyard | 308/187.2 |
| 4,163,825 | 8/1979 | Wimmes | 308/DIG. 8 X |
| 4,236,767 | 12/1980 | Feldle | 308/187.1 |
| 4,305,592 | 12/1981 | Peterson | 308/187.1 X |

Primary Examiner—John J. Vrablik
Assistant Examiner—Theodore Olds
Attorney, Agent, or Firm—Wenderoth, Lind & Ponack

[57] ABSTRACT

The disclosed rolling piston type compressor comprises a needle bearing sandwiched between two bearing washers and serving as a thrust bearing for a rotary shaft and a resilient sealing ring of polytetrafluoroethylene press fitted into a space defined by the outer periphery of the needle bearing and the two bearing washers. Alternatively the sealing ring may be formed of cast iron and seal the space with an oil film disposed in a clearance between the ring and one of the bearing washers.

8 Claims, 6 Drawing Figures

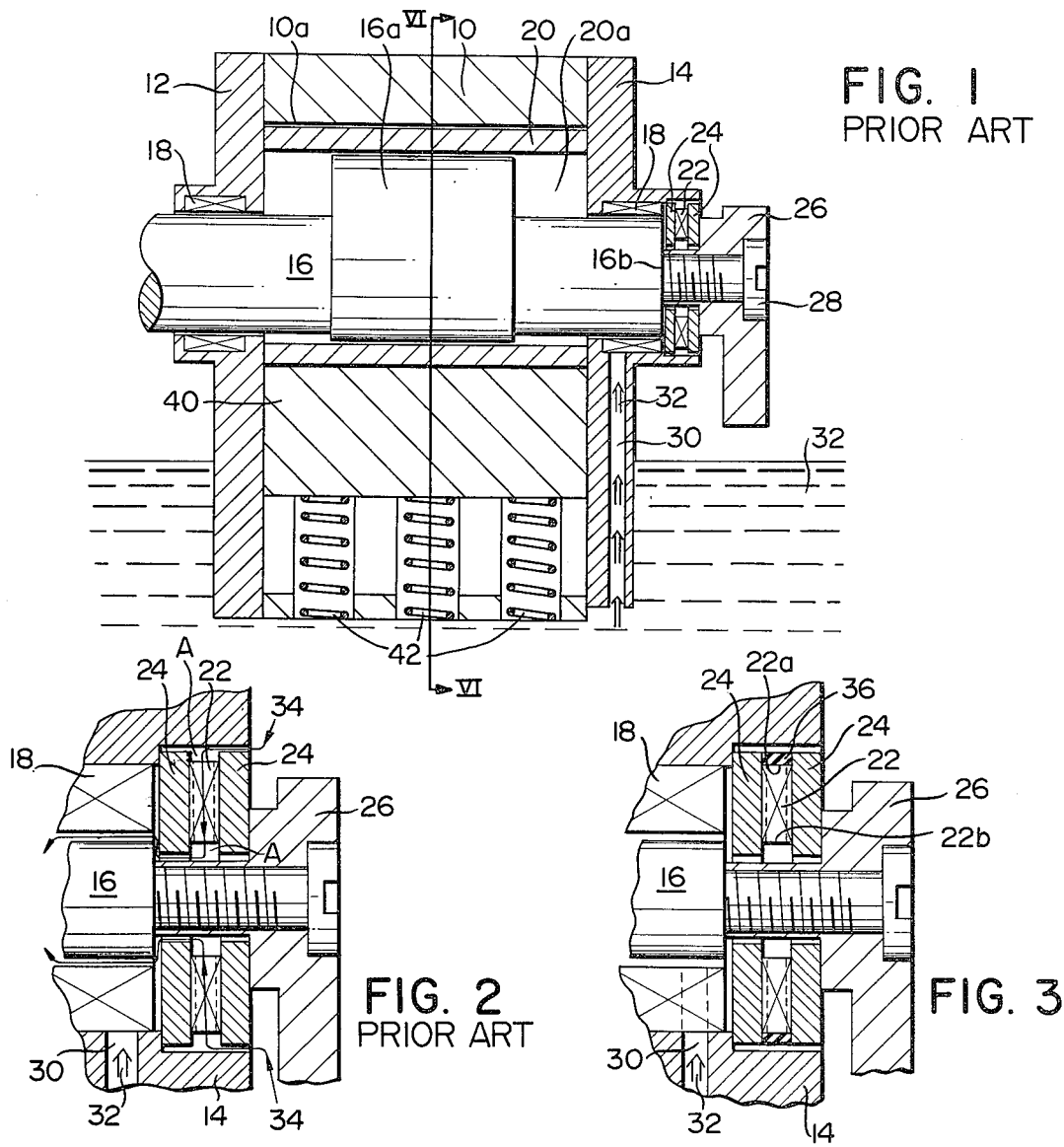
FIG. 1 PRIOR ART
FIG. 2 PRIOR ART
FIG. 3
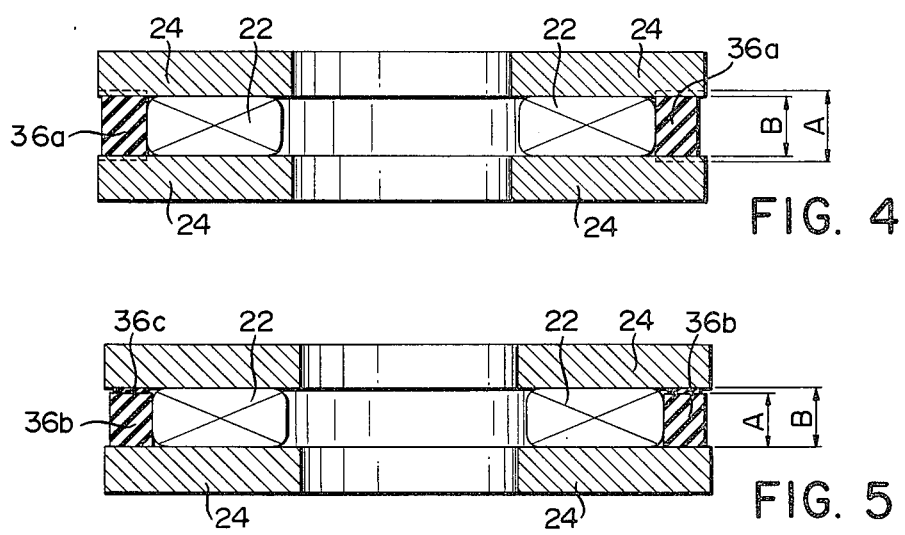
FIG. 4
FIG. 5

ROLLING PISTON TYPE COMPRESSOR

BACKGROUND OF THE INVENTION

This invention relates to a rolling piston type compressor, and more particularly to improvements in a sealing structure of a thrust bearing disposed at one end of a rotary shaft involved in such a compressor.

Conventional rolling piston type compressors have adopted the needle bearing as the thrust bearing for the rotary shaft known as bearing both high speed operation thereof and high loads imposed thereon. However the needle bearing includes a plurality of needles having clearances therebetween through which an external gas or gases leaks or leak. This has resulted in one of the great causes for which rolling piston type compressors much decrease in performance.

Accordingly, it is an object of the present invention to provide a new and improved rolling piston type compressor including means for preventing an external gas or gases from entering a needle bearing involved.

SUMMARY OF THE INVENTION

The present invention provides a rolling piston type compressor comprising a cylinder, a pair of housings disposed at both ends of the cylinder to form a compression compartment with the cylinder, a rotary shaft rotatably extending through the cylinder on the longitudinal axis, a pair of bearings disposed in the respective housings to rotatably support the rotary shaft, an eccentric member disposed on the rotary shaft between the pair of bearings, a hollow rolling piston disposed on the outer periphery of the eccentric member to be put in rotatable engagement with the housings, the rolling piston being driven by the rotary shaft to compress a gas within the compression compartment, a balance weight disposed on at least one of the ends of the rotary shaft outside of the mating housing, a needle bearing for the rotary shaft sandwiched between a pair of bearing washers and disposed between the balance weight and the mating housing to form a space defined by a selected one of the outer and inner peripheries of the needle bearing and the pair of bearing washers, and gas flow prevention means disposed in the space to prevent a stream of a gas from flowing through the space.

Preferably, the gas flow prevention means comprises a resilient sealing ring engaging the selected periphery side of the needle bearing and hermetically put between the pair of bearing washers.

BRIEF DESCRIPTION OF THE DRAWINGS

The present invention will become more readily apparent from the following detailed description taken in conjunction with the accompanying drawings in which:

FIG. 1 is a longitudinal sectional view of a conventional rolling piston type compressor;

FIG. 2 is a fragmental longitudinal sectional view, in an enlarged scale, of the thrust bearing and the adjacent components shown in FIG. 1;

FIG. 3 is an enlarged longitudinal sectional view of one embodiment according to the thrust bearing unit of the present invention and the adjacent components;

FIG. 4 is a longitudinal sectional view of a modification of the present invention;

FIG. 5 is a view similar to FIG. 4 but illustrating another modification of the present invention.

DESCRIPTION OF THE PREFERRED EMBODIMENTS

Figure 6:
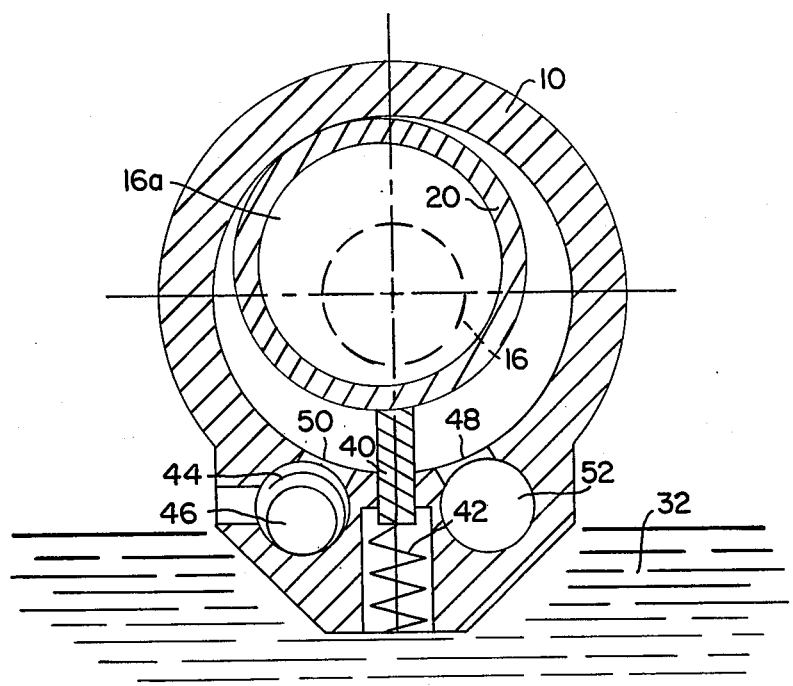
FIG. 6 is a cross-sectional view of a conventional rolling piston type compressor taken along lines VI—VI in FIG. 1.

Referring now to FIG. 1 of the drawings, there is illustrated a general rolling piston type compressor previously employed. The arrangement illustrated comprises a cylinder 10, a front housing 12 and a rear housing 14 disposed at opposite ends of the cylinder 10 to form a compression compartment 10a within the cylinder 10, a rotary shaft generally designated by the reference numeral 16 rotatably extending through the cylinder 10 on the longitudinal axis thereof and a pair of main bearings 18 disposed in the housings 12 and 14 to rotatably support the respective end portions of the rotary shaft after having extended through central openings on the housings 12 and 14. The rotary shaft 16 includes an eccentric member 16a disposed on the intermediate portion thereof located between the housings 12 and 14. A rolling piston 20 in the form of a hollow cylinder is disposed on the outer periphery of the eccentric member 16a with both of its ends in rotatable engagement with the adjacent housings 12 and 14. During the rotational movement of the rotary shaft 16 due to a driving source (not shown), the rolling piston 20 is eccentrically rotated with respect to the inner surface of the cylinder 10 through the eccentric member 16a to compress a gas within the compression compartment 10a as illustrated in FIGS. 1 and 6.

The rotary shaft 16 includes a rear end 16b slightly projecting from the outer end of the adjacent main bearing 18 and abutting against a thrust bearing, in this case, a needle bearing 22 through a bearing washer 24. The needle bearing 22 is sandwiched between one bearing washer 24 and the other bearing washer 24 and disposed within a central hollow protrusion of the rear housing 14. The rear end 16b of the rotary shaft 16 includes also a balance weight 26 fixed thereto through a fastening bolt 28 screw threaded into the rear shaft end 16b for balancing purposes.

As shown in FIG. 1, the rear housing 14 includes a lubricating hole 30 radially extending from its outer periphery to the outer surface of the main bearing 18 and the arrangemment has its lower portion immersed in lubricating oil 32. Thus the lubricating hole 30 is open in the lubricating oil 32. As a result themain bearing 18 and the rolling piston 20 is lubricated through the lubricating hole 30 utilizing a differential pressure.

As is also illustrated in FIGS. 1 and 6, the conventional rolling piston type compressors include a vane 40 urged upward by vane springs 42 into abutment with rolling piston 20. FIG. 6 also illustrates a suction compartment 52 which communicates with the interior of cylinder 10 through a suction port 50, and a discharge port 48 which communicates with discharge stopper 46 unless blocked by discharge valve 44.

In conventional rolling piston type compressors such as shown in FIGS. 1 and 2, an external gas or gases 34 might enter a clearance between the outer periphery of the outer bearing washer 24 and the adjacent inner wall surface of the central protrusion of the rear housing 14 and then a space A located around the outer periphery of the needle bearing 22 and sandwiched between the two bearing washers 24, as shown by the arrowed solid line in FIG. 2. Then the gas or gases pass through gaps between needles of the needle bearing 22 to reach another space A located around the inner periphery of the needle bearing 22 and sandwiched between the two bearing washers 24, after which the gas or gases enters or enter a clearance between the inner periphery of the inner bearing washer 24 and the adjacent periphery of the balance weight 26 and then a clearance between the inner periphery of the main bearing 18 and the adjacent outer peripheral portion of the rotary shaft 16 as shown by the arrowed solid line in FIG. 2. This has resulted in an increase in pressure within a space 20a defined by the rolling piston 20 and the rotary shaft 16 with the eccentric member 16a and the rear housing 14 shown in FIG. 1. Therefore a lubrication mechanism including the lubricating hole 30 has been unbalanced so that the main bearing 18 and the rolling piston 20 is insufficiently lubricated with the oil 32. Alternatively the external gas or gases might further enter the interior of the cylinder 10 along the end surface of the rolling piston 16 resulting in a reduction in volume efficiency. In each case, the compressor is much reduced in performance.

Referring now to FIG. 3 wherein like reference numerals designate the components identical to those shown in FIG. 2, there is illustrated one embodiment according to the thrust bearing unit of the present invention. The arrangement illustrated is different from that shown in FIG. 2 only in that in FIG. 3 a resilient sealing ring 36 fully fills the space located around the outer periphery 22a and sandwiched between the pair of bearing washers 24.

In FIGS. 4 and 5 wherein like reference numerals designate the components identical to those shown in FIG. 3 there are two different modifications of the present invention.

The resilient sealing ring 36a shown in FIG. 4 is formed to a width A somewhat larger than the spacing B between the opposite bearing washers 24 of a polytetrafluoroethylene. Then the sealing ring 36a thus formed is press-fitted in the spacing. It has been found that the width A of the sealing ring 36a is larger than the spacing B by from 10 to 20 microns with the satisfactory result.

In FIG. 5, the resilient sealing ring 36b is formed to a width A somewhat smaller than the spacing B between opposite bearing washers 24 of cast iron. Then sealing ring 36b thus formed is placed in the spacing so as to intimately contact both the outer periphery of the needle bearing 22 and one of the bearing washers 24. Following this a clearance between the sealing ring 36b and the outer bearing washer 24 is filled with a suitable oil film 36c formed of a lubricating oil.

It has been found that the width A of the sealing ring 36b is smaller than the spacing between the bearing washers by a few microns with the satisfactory result.

From the foregoing it is seen that in the arrangement shown in each of FIGS. 4 and 5, the resilient sealing ring fully fills the space located around the outer periphery of the needle bearing and sandwiched between the pair of bearing washers to prevent a flow of an external gas or gases therethrough. Thus the resilient sealing ring completely blocks the stream of the external gas or gases to permit the normal lubrication to be maintained. Also, the resilient sealing ring can effectively prevent the external gas or gases from further entering the interior of the cylinder along the end surface of the rolling piston thereby to prevent a reduction in volume efficiency. It has been experimentally found that the present invention can improve the performance characteristics by not less than 10% as compared with the arrangement shown in FIGS. 1 and 2.

While the present invention has been illustrated and described in conjunction with a few preferred embodiments thereof it is to be understood that numerous changes and modifications may be resorted to without departing from the spirit and scope of the present invention. For example, the present invention has been illustrated and described in conjunction with the sealing ring engaging the outer periphery of the needle bearing, but it is to be understood that the same is not restricted thereby or thereto and that the sealing ring may be disposed on the inner periphery 22b of the needle bearing 22. Also the sealing ring may be formed of any suitable resilient material other than that described above in conjunction with FIGS. 4 and 5.

What is claimed is:

1. A rolling piston type compressor comprising a cylinder having first and second ends, first and second housings respectively disposed at said first and second ends of said cylinder to form a compressor compartment within said cylinder, a rotary shaft rotatably extending through said cylinder on the longitudinal axis thereof, first and second bearings disposed in said first and second housings, respectively, to rotatably support said rotary shaft, an eccentric member disposed on said rotary shaft between said first and second bearings, a hollow rolling piston disposed on the outer periphery of said eccentric member rotatably engagable with said first and second housings, said rolling piston being drivable by said rotary shaft to compress a gas within said compression compartment, a balance weight disposed on said first end of said rotary shaft outside of said first housing, means, communicating with said first bearing, for providing lubricant to said first bearing by differential pressure, a pair of bearing washers and a needle bearing for said rotary shaft sandwiched between said pair of bearing washers, disposed between said balance weight and said first housing to form a space defined by a selected one of the outer and inner periphery of said needle bearing and said pair of bearing washers, and means, disposed in said space, for sealing said space against gas flow through said space.

2. A rolling piston type compressor comprising a cylinder having first and second ends, first and second housings respectively disposed at said first and second ends of said cylinder to form a compressor compartment within said cylinder, a rotary shaft rotatably extending through said cylinder on the longitudinal axis thereof, first and second bearings disposed in said first and second housings, respectively, to rotatably support said rotary shaft, an eccentric member disposed on said rotary shaft between said first and second bearings, a hollow rolling piston disposed on the outer periphery of said eccentric member rotatably engagable with said first and second housings, said rolling piston being drivable by said rotary shaft to compress a gas within said compression compartment, a balance weight disposed on said first end of said rotary shaft outside of said first housing, said first housing including a lubrication hole radially extending therethrough so as to reach said first bearing so as to provide lubricant to said first bearing through said lubrication hole by differential pressure, a pair of bearing washers and a needle bearing for said rotary shaft sandwiched between said pair of bearing washers, disposed between said balance weight and said first housing to form a space defined by a selected one of the outer and inner periphery of said needle bearing and said pair of bearing washers, and means, disposed in said space, for sealing said space against gas flow through said space.

3. A rolling piston type compressor as claimed in claim 1, wherein said sealing ring is formed to a width larger than the spacing between said pair of bearing washers of a resilient material and press fitted in said spacing.

4. A rolling piston type compressor as claimed in claim 3 wherein said resilient sealing ring has the width larger than said spacing by from 10 to 20 microns.

5. A rolling piston type compressor as claimed in claim 3 wherein said sealing ring is formed of a polytetrafluoroethylene.

6. A rolling piston type compressor as claimed in claim 1 wherein said sealing means comprises a sealing ring formed to a width smaller than a spacing between said pair of bearing washers and disposed in said space with a clearance between said sealing ring and only one of said pair of bearing washers, said clearance being fully filled with an oil film.

7. A rolling piston type compressor as claimed in claim 6 wherein said sealing ring has the width smaller than said spacing by a few microns.

8. A rolling piston type compressor as claimed in claim 1, wherein said sealing means comprises a sealing ring disposed entirely radially inwardly of the outer circumferential surfaces and entirely radially outwardly of the inner circumferential surfaces of said pair of bearing washers and between said pair of bearing washers.

* * * * *